UNITED STATES PATENT OFFICE.

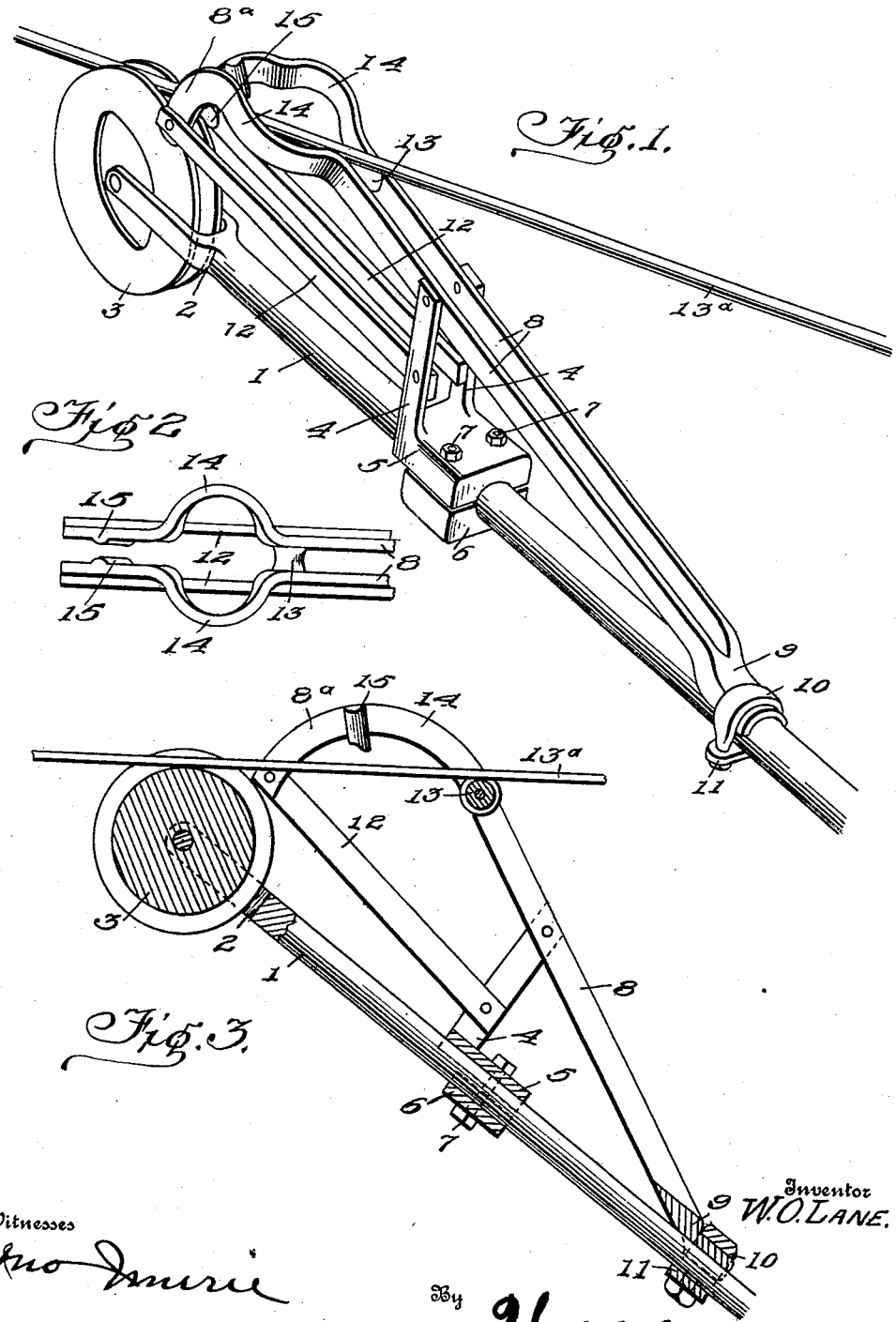

WILLIAM O. LANE, OF CLEVELAND, OHIO.

DEVICE TO PREVENT TROLLEY-WHEELS FROM JUMPING.

No. 904,541.  Specification of Letters Patent.  Patented Nov. 24, 1908.

Application filed March 12, 1908. Serial No. 420,663.

*To all whom it may concern:*

Be it known that I, WILLIAM O. LANE, citizen of the United States, residing at Cleveland, in the county of Cuyahoga and State of Ohio, have invented certain new and useful Improvements in Devices to Prevent Trolley-Wheels from Jumping, of which the following is a specification.

This invention has for its object a simple, durable and efficient construction of trolley guard, which may be easily applied to a trolley pole and adjusted to the proper position to effectually protect the pole and wheel, and serve to maintain the latter in proper alinement and contact with the wire, and the invention consists in certain constructions, arrangements and combinations of the parts that I shall hereinafter fully describe and claim.

For a full understanding of the invention and the merits thereof, reference is to be had to the following description and accompanying drawings, in which:

Figure 1 is a perspective view of my improved trolley guard; Fig. 2 is a top plan view of a portion thereof; and, Fig. 3 is a side elevation with parts in section.

Corresponding and like parts are referred to in the following description and indicated in all the views of the drawing, by the same reference characters.

Referring to the drawing, the numeral 1 designates a trolley pole which may be of any desired design or construction, 2 the harp or head thereof, 3 the trolley wheel journaled in said harp. My improved trolley guard, in the present instance, comprises a forked bracket 4 which is designed to be secured at the proper point on the upper end of the trolley pole 1, and which is formed with an offset cross-bar 5, preferably grooved to fit the pole and held thereon by means of a clamp plate 6 and bolts 7 passing therethrough and through the cross bar 5.

8 designates a pair of guiding arms that extend parallel to each other, and that are designed to extend upwardly and rearwardly in advance of the trolley pole 1, and at a slight inclination thereto, said arms being formed integral with, or riveted, or otherwise secured to the upper ends of the members of the forked bracket 4, intermediate of the ends of said arms, the arms curving rearwardly and downwardly at points in the rear of said bracket arms, as indicated at 8ª. The lower forward ends of the guiding arms 8 are preferably integrally connected together by a stem 9, which may be rounded to fit against the pole, as shown, and which may be secured thereto by means of a clip 10, 11 designating the gland of said clip.

The rear curved ends of the guide arms 8 are rigidly connected to the arms of the bracket 4, near the base thereof, by means of reinforcing bars 12, thus serving to impart strength and rigidity to the structure.

13 designates a roller which is journaled in and between the arms 8, back of the bracket 4, and which is designed to have the trolley wire 13ª ride thereon, when the same is at a slight elevation above the car, as for instance, when the car is running underneath bridges, grade crossings, or into car barns. The purpose of this roller 13 is to prevent the rear curved ends of the guide 8 from rising so high above the wire as to strike the circuit breakers that are attached to the hangers, and to prevent them from coming into contact with other obstructions which would be liable to throw the device out of gear, or so injure it as to impair its efficiency.

The guide arms 8 are formed in the rear of said roller 13, and preferably commencing at said roller with outwardly and laterally bowed portions 14 which are for the purpose of permitting the trolley pole to swing as the car is rounding a curve. In addition to these bowed portions 14, the guide arms 8 are formed in their curved portions 8ª with inwardly projecting lugs or protuberances 15, said lugs projecting inwardly towards each other, as shown, and being for the purpose of preventing the trolley from jumping off when the car is rounding curves, in case the wire should ride up the side of the trolley wheel.

From the foregoing description, in connection with the accompanying drawing, it will be apparent that I have provided a very simple and effective construction of trolley guard which may be placed at the required position on the trolley pole, with relation to the trolley wheel, to take a switch at the same time the trolley wheel leaves the wire for the switch pan, and which, in operation, will effectually prevent a twisted trolley from riding up the side of the trolley wheel on a curve, with the consequent jumping of the wheel from the wire; which will prevent any bumping or jarring of the device, when the trolley pole is depressed, the roller 13 then riding upon the wire, and which, in short, will serve to maintain the trolley wheel at all times in proper alinement to, and in contact with the trolley wire.

Having thus described the invention, what I claim is:

1. In a device of the character described, the combination with a trolley pole and its wheel, of a bracket secured to said trolley pole near the upper end thereof, a pair of spaced arms connected intermediate of their ends to said bracket and extending upwardly and rearwardly therefrom in advance of the pole, and means for securing the lower ends of said arms to the pole, the said arms being outwardly bowed near their opposite ends.

2. In a device of the character described, the combination with a trolley pole and its wheel, of a pair of spaced arms arranged to be secured to said pole and held in advance thereof, and a roller, journaled in and between said arms, as and for the purpose set forth.

3. In a device of the character described, the combination with a trolley pole and its wheel, of a pair of spaced guide arms arranged to be connected to the pole and held in advance thereof, the upper ends of said arms extending downwardly and provided with inwardly extending opposing lugs, as and for the purpose set forth.

4. In a device of the character described, the combination with a trolley pole and its wheel, of a pair of spaced guide arms arranged to be connected to the pole and held in advance thereof, the upper ends of said arms extending downwardly and provided with a pair of inwardly and downwardly projecting opposing lugs.

5. A device of the character described, comprising a pair of arms held in spaced relation to each other and adapted to be secured to a trolley pole in advance of the wheel thereof, said arms being provided with oppositely registering outwardly bowed portions and with inwardly extending lugs above or beyond such bowed portions, and a roller journaled in and between said arms at the opposite side of said bowed portions.

6. A device of the character described, comprising a pair of spaced arms curved rearwardly at one end and provided with a connecting stem at the opposite end, arranged for attachment with a trolley pole, a forked bracket also adapted to be connected to a pole and attached to said arms intermediate of the ends thereof, said arms being provided between said bracket and their rearwardly curved extremities, with outwardly bowed portions and with inwardly projecting lugs beyond said bowed portions, and a roller journaled in and between said arms at the opposite side of said bowed portions.

7. A device of the character described, comprising a pair of spaced arms, a bracket, to which said arms are secured, and by which they are designed to be held upon a trolley pole, said arms extending rearwardly at their upper ends, and reinforcing bars connecting the upper curved ends of the arms with the bracket.

In testimony whereof I affix my signature in presence of two witnesses.

WILLIAM O. LANE.

Witnesses:
O. W. BROADWELL,
B. G. CHENOWETH.